United States Patent [19]

Fink

[11] 4,319,304

[45] Mar. 9, 1982

[54] TUBULAR CAPACITOR WITH AXIAL CONNECTIONS

[75] Inventor: Rudolf Fink, Selb, Fed. Rep. of Germany

[73] Assignee: Draloric Electronic GmbH, Fed. Rep. of Germany

[21] Appl. No.: 46,660

[22] Filed: Jun. 8, 1979

[30] Foreign Application Priority Data

Nov. 21, 1978 [DE] Fed. Rep. of Germany ....... 2850407
Dec. 16, 1978 [DE] Fed. Rep. of Germany ....... 2854446
Dec. 21, 1978 [DE] Fed. Rep. of Germany ....... 2855235

[51] Int. Cl.³ ............................................. H01G 1/14
[52] U.S. Cl. ...................................... 361/307; 361/321
[58] Field of Search ........................ 361/321, 307, 310

[56] References Cited

U.S. PATENT DOCUMENTS 2,389,640 11/1945 Ruben ............................ 361/307 X
2,702,878 2/1955 Heibel ............................ 361/310 X

FOREIGN PATENT DOCUMENTS 2545350 4/1977 Fed. Rep. of Germany ...... 361/307
2801079 7/1978 Fed. Rep. of Germany ...... 361/307
896078 1/1961 United Kingdom ................ 361/310

*Primary Examiner*—Elliot A. Goldberg

[57] ABSTRACT

The disclosure concerns a tubular capacitor having a relatively thin tube of dielectric material with metal layers formed on the outer and inner surfaces for forming the capacitor plates. A connecting cap is pushed over the outer layer and is connected electrically with one wire leading out of the capacitor. Another connecting wire extends into the tube and includes a widened portion that is engaged with or extends toward the inner layer. The widened portion is opposed to the pressure on the tube by the connecting cap. Insulation is provided in the exterior of the capacitor between the end of the wire and the connecting cap.

10 Claims, 6 Drawing Figures

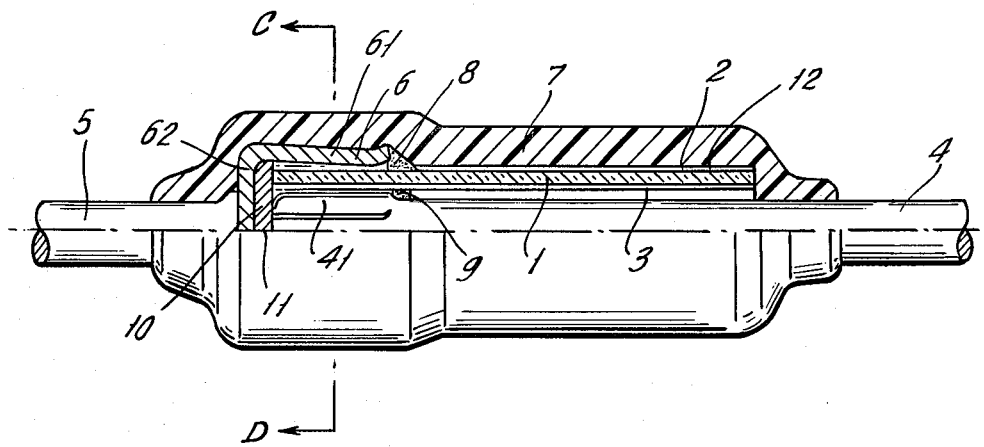
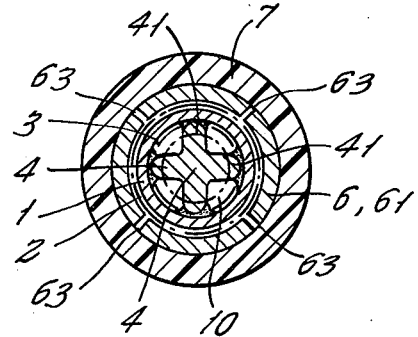
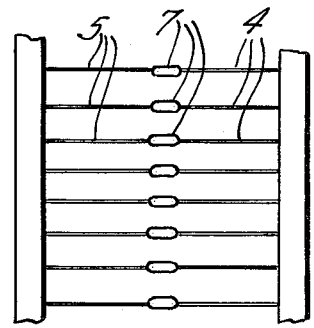

TUBULAR CAPACITOR WITH AXIAL CONNECTIONS

BACKGROUND OF THE INVENTION

The present invention relates to a tubular shaped capacitor with axial connections. The tubular structure is preferably formed from a ceramic member which serves as the dielectric and has a layer of metal on each of the outer surface and the inner surface for forming the capacitor plates. A connecting cap is pushed over the end of the ceramic member and is in contact with the outer surface and the cap is thereby connected with the layer of metal forming the capacitor plate on the outer surface. The shell of the connecting cap which is connected to the outer layer exerts, when it is placed on the tubular dielectric member, a pressure whose resultant is less than the allowable compressive strength of the dielectric or ceramic member. A connecting wire is secured at the inner surface and thus connected to the inner layer. The connecting wire is widened within the tubular structure to engage the inner layer and is also beaded at the end of the tubular structure to ensure its securement therein.

A tubular capacitor of this type is shown in West German Provisional Patent (Auslegeschrift) No. 1,130,878 (FIG. 7). Here the connecting cap is arranged in the vicinity of one end and the widened end of a connecting wire is arranged in the region of the other end of the tubular dielectric structure so that with extremely thin wall thicknesses of the dielectric structure, the pushing-on of the connecting cap during manufacture presents a danger of breakage. This possibility of breakage results from the firing shrinkage which occurs upon the sinter firing of the tubular dielectric structure and from the corresponding measurement-tolerance range of the dielectric structure.

A similar tubular capacitor is also shown in West German Pat. No. 828,414 (FIG. 2). In that capacitor, however, the connections are secured in the vicinity of the opposite ends of the tubular dielectric structure and extend parallel to each other. In such a structure, the problem of the possibility of breakage in the utilization of thin walled tubular dielectric structure of the order of 0.1 mm wall thickness also occurs in the same manner as in the first mentioned prior structure.

A tubular capacitor having two stamped metal connections fastened only to the outer surface of the tubular dielectric structure is shown in U.S. Pat. No. 3,129,490 (FIG. 7). The inner plate is extended around one end up to the outer surface. Such a configuration of the plate metal coatings can be produced only at considerable expense.

One method of producing tubular capacitors in which the tubular dielectric structures are pushed over connecting elements which have been stamped out of metal strips and bent, and then soldered together, is shown in West German Unexamined Application for Patent (Offenlegungsschrift) No. 2,263,279. Tubular capacitors are produced by a simple method. However, they do not have axial connections, but instead have radial connections.

As a result of the trend to automatic manufacturing processes, it is desirable to develop components with axial connections and to supply them in belted form. In fact, it is possible, with only slight modifications to employ machines used for the manufacture of capped electrical resistors having axial connecting wires for the manufacture of electrical capacitors as well.

The West German Unexamined Applications for Patent (Offenlegungsschrift) No. 2,650,177 and 2,652,895 show methods for the production of electrical capacitors in which resistor production machines can be used in modified form for constructing the capacitors. In these methods, the supporting bodies are known as layer resistors.

Different forms of the widening of the end of the wire extending into the borehole for electrical components are shown in West German Pat. No. 601,284, West German Pat. No. 965,703, West German Provisional Patent (Auslegeschrift) No. 1,018,123, West German Pat. No. 1,054,541, West German Pat. No. 1,194,945 and West German Unexamined Application for Patent (Offenlegungsschrift) No. 1,790,090. In all of these structures, widening of a connecting wire is shown but these widenings are for capless resistors which are inserted into a blind hole of a supporting body.

SUMMARY OF THE INVENTION

The object of the present invention is to provide a tubular capacitor of the type described above which can be manufactured in a simple manner with modified utilization of the technology known from electrical resistors and using axial connections and in which the arrangement of electrical contacts for connections can be effected in an electrically reliable and mechanically simple manner, even in the case of extremely thin tubular dielectric structure wall thicknesses and measurement tolerances of the dielectric structure which occurs as a result of firing shrinkage.

The advantages obtained with the structure of the present invention reside in the facts that the diameter tolerances of the tubular dielectric structure which result due to firing shrinkage are insignificant, that the wall thickness of the tubular dielectric structure can be made as thin as desired since the contact caps do not press directly against the dielectric, and that an adhesive connection resists the contact caps being pulled off.

Another considerable advantage resides in the fact that a long piece of the densely sintered dielectric material can be completely metallized on the inside and the outside by known methods and can then be cut into individual lengths to form a plurality of separate capacitors.

Another advantage lies in the use of the full length of the tubular dielectric structure for the capacitance as well as the capability of thereby producing a plurality of matching capacitors of closely similar or equal capacitances within reasonable tolerances.

Other objects and features of the invention are described in the following description of embodiments of the invention considered in conjunction with the accompanying drawings.

BRIEF DESCRIPTION OF THE DRAWINGS

FIG. 2 is a view similar to FIG. 1 showing another embodiment of the invention.

FIG. 5 is a cross-sectional view along the line C-D of FIG. 2.

FIG. 6 shows belted tubular capacitors in size with axial wire connections.

DESCRIPTION OF THE PREFERRED EMBODIMENTS

Figure 1:
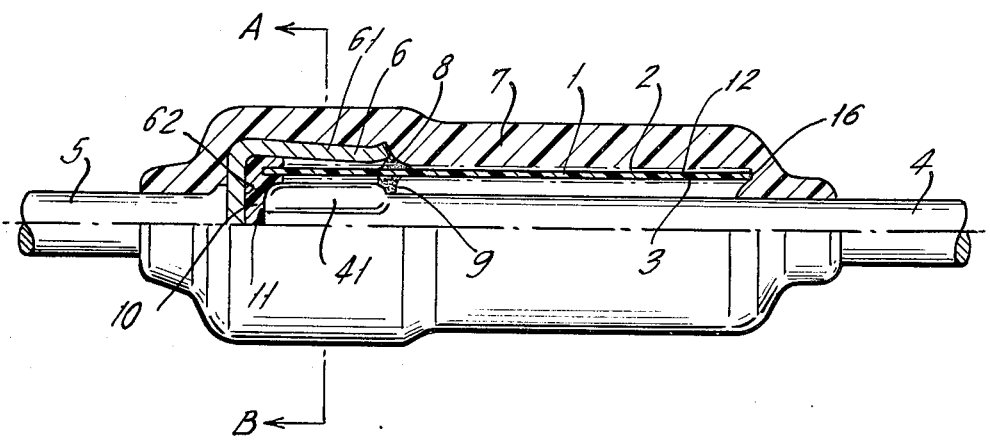
FIG. 1 is a side view, partly in longitudinal section, of a capacitor showing one embodiment of the present invention.
Figure 3:
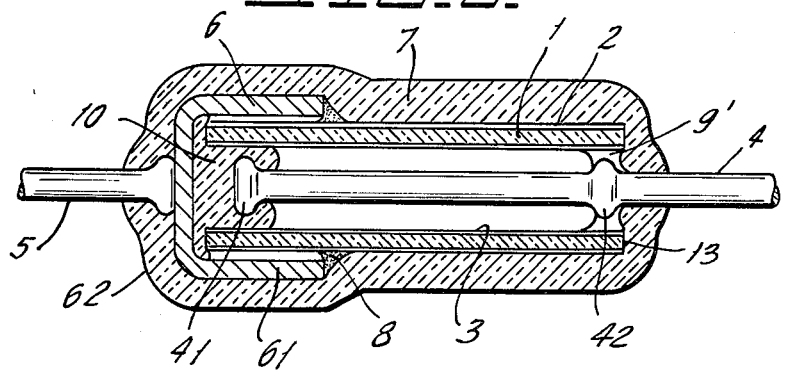
FIG. 3 is a side view in longitudinal section showing a third embodiment of the invention.

In the embodiments of FIGS. 1, 2 and 3, there is a densely sintered tubular dielectric member 1 of circular cross-section. It is coated with respective metal layers 2, 3 on both its outer surface and its inner surface. The metal layers define opposite capacitor plates. A circular cross-section connecting wire 4, which has an elastically deformable widened cruciform cross-section area 41 at one end is inserted into the central borehole of the tubular dielectric member 1 shown in FIG. 1 to connect the wire 4 to the inner metal layer 3. The widened area 41 bears resiliently against the inner layer 3 and establishes electrical contact therewith. There is a solder connection 9 between the inner layer 3 and the connecting wire 4.

Figure 4:
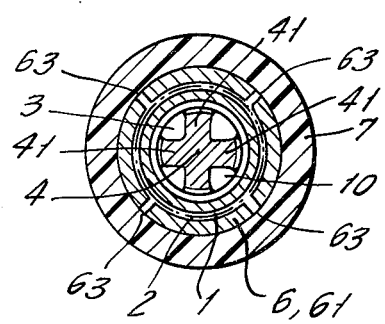
FIG. 4 is a cross-sectional view along the line A-B of FIG. 1.

At the same end of the capacitor as the widened area 41 and around the outside of the widened area a generally tulip clip-like connecting cap 6 is provided. The shell 61 of the cap 6 rests on the dielectric member 1. The cap 6 has slits 63 in its skirt that define fingers which engage the outer metal layer 2, as can be noted from FIG. 4. There is a solder connection 8 between the cap 6 and the outer layer 2. Because the widened portion 41 of the connecting wire 4 is initially somewhat smaller than the inside diameter of the dielectric member 1 but resiliently presses against the inner layer 3 and because the fingers of the shell 61 of the connecting cap 6 lie only resiliently against the dielectric member 1, excessive compressive forces are not produced, so that the tubular dielectric members, which may be as thin as desired, is not subjected to impermissible breaking stresses.

In order to improve insulating characteristics and provide increased resistance to removal of the cap 6, a sheet of insulating material 10 is arranged between the bottom 62 of the connecting cap 6 and the end 11 of the dielectric member 1. For this purpose, bottom 62 of the connecting cap 6 is covered with an insulating lacquer.

The end of a second connecting wire 5 projects into the other end of the tubular capacitor for being electrically and mechanically connected to the connecting cap 6. The wire 5 is welded to the cap 6.

Because the widened area 41 of the connecting wire 4 presses elastically radially outwardly against the inner metal layer 3 and the fingers of the connecting cap 6 press radially inwardly at the same area, the radially directed forces substantially counteract each other so that the dimensional tolerances are balanced out and the tubular dielectric member is not subjected to impermissibly high breaking stresses. These elastic compressive forces, as well as the respective solder connections 8, 9 between the cap 6 and layer 2 and the connecting wire 4 and layer 3 and the welding in of cap 6, produce a high mechanical resistance to the tearing out of the connecting wires 4, 5.

An electrically insulating covering 7 surrounds the tubular capacitor completely and protects it from external influences.

The outer metal layer 2 of the tubular capacitor may be provided with a matching sleeve 12 in order to provide additional protection and reinforcement for the same.

The embodiments of FIGS. 1 and 2, although somewhat different from each other, follow the same principles and have the same major components. In FIG. 1, the tubular dielectric member 1 is securely held in position with respect to the insulating covering 7 and the connecting cap 6. To this end, at the connecting cap 6, the tubular member 1 and its metal layers 2 and 3 are embedded in the layer of insulating material 10, instead of simply abutting that layer as in FIG. 2. Also, the opposite end of the tubular member 1 is received in a pocket depression 16 in the covering 7.

The embodiment of FIG. 3 also has the same components as the other embodiments, with the differences noted below. FIG. 3 shows a densely sintered, tubular-shaped dielectric member 1 of circular cross-section the outer and inner surfaces of which are completely covered with metal layers 2, 3 respectively. These layers form the capacitor plates. The connecting wire 4 is inserted into the central bore of the tubular dielectric 1. In place of the cruciform shape widened section 41, the end of the wire 4 has a nailhead shaped widening 41 which has a smaller diameter than the inside diameter of the dielectric member 1. As in the other embodiments, on the outer surface of the dielectric member 1, a longitudinally slitted connecting cap 6 is arranged, to which a connecting wire 5 is welded. The slitted section of the connecting cap 6 ensures that no compressive forces act on the dielectric member. In order to assure high mechanical resistance of the connections 4 and 5 to being pulled out, a plug of an adhesive hardenable insulating material 10 is present between the bottom 62 of the connecting cap 6 and the end nailhead-shaped widening 41 of the connecting wire 4. The insulating material extends around the widening 41 and this firmly mechanically connects the connecting wire 4 and the connecting cap 6 mechanically with each other. Unlike the other two embodiments, because there is no electric connection between the widening 41 and the inner layer 3 on the tubular dielectric member 1, there is a solder connection 9' between the inner layer 3 and the roll 42 on the connecting wire 4.

The widening 42 is also of smaller diameter than the inside diameter of dielectric member 1. The soldering 9' establishes electric contact between roll 42 and inner layer 3. Due to the fact that the nailhead widening 41 and the roll 42 of the connecting wire 4 are both somewhat smaller than the inside diameter of the dielectric member 1 and the slit shell fingers 61 of the connecting cap 6 lie only resiliently against the dielectric body 1, no undesirable compressive forces are produced, so that the tubular dielectric member, no matter how thin, is not subjected to breaking stresses. High mechanical resistance of the connecting wires 4 and 5 to being pulled out is assured by the hardened insulating material layer 10.

The electrically insulating covering 7 surrounds the tubular capacitor completely and protects it from external influences.

FIG. 6 shows belted tubular capacitors whose connecting wires 4 and 5 extend axially out of the respective electrically insulating covering 7.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A tubular capacitor with axial connections, comprising:
   a tubular dielectric member having an outer surface with an outer metal layer on it and an inner surface with an inner metal layer on it, said outer and inner layers defining opposed capacitor plates;
   a connecting cap having a shell resiliently fitted over said outer layer and connected electrically with said outer layer and exerting a radially directed inward force on said tubular dielectric member;
   a first connecting wire extending inside said inner layer and in electrical contact with said inner layer; said first connecting wire and said connecting cap extending in opposite axial directions;
   a portion of said first connecting wire located inside said inner layer being widened at an area registering with and located inside said shell said widened area being of a size to exert a radially directed outward force on said tubular dielectric member; said widened portion of said first connecting wire and said shell which engages said outer layer being adapted to exert a pressure on said tubular dielectric member which is less than the permissible compressive strength of said dielectric member, said radially directed inward force placed on said tubular dielectric member by said shell being substantially counteracted by said radially directed outward force placed on said tubular dielectric member by said widened area of said connecting wire such that said tubular dielectric member is not subjected to impermissibly high breaking stresses.

2. The tubular capacitor of claim 1, further comprising a second connecting wire electrically connected to said shell and extending from said tubular dielectric member in a direction axially opposite to said first connecting wire.

3. The tubular capacitor of claim 2, wherein said second connecting wire is attached to said shell.

4. The tubular capacitor of any of claims 1, 2 or 3 further comprising a layer of insulating material arranged between the end of said first connecting wire and the interior of said connecting cap for adhesively holding said first connecting wire and said connecting cap together.

5. The tubular capacitor of claim 1, wherein said widened portion is located at one end of said connecting wire.

6. The tubular capacitor of claim 1, wherein said connecting cap is longitudinally slitted to define fingers thereof, to provide elastic resiliency and to permit said connecting cap to tightly engage said outer layer.

7. The tubular capacitor of claim 1, wherein said connecting cap directly engages said outer metal layer and said connecting wire is connected with said inner metal layer by a solder connection.

8. The tubular capacitor of claim 1, wherein said outer metal layer is provided with a matching sleeve.

9. The tubular capacitor of claim 1, wherein said widened portion is cruciform in cross-section.

10. The tubular capacitor of claims 1, 2 or 6, wherein the entire capacitor is encapsulated in electrically insulating material.

* * * * *